United States Patent
Tsuzuki et al.

(10) Patent No.: US 7,032,375 B2
(45) Date of Patent: Apr. 25, 2006

(54) SECONDARY AIR SUPPLY SYSTEM

(75) Inventors: Kunihiro Tsuzuki, Obu (JP); Shinichi Yokoyama, Gifu (JP)

(73) Assignee: Denso Corporation, (JP)

( * ) Notice: Subject to any disclaimer, the term of this patent is extended or adjusted under 35 U.S.C. 154(b) by 98 days.

(21) Appl. No.: 10/781,823

(22) Filed: Feb. 20, 2004

(65) Prior Publication Data

US 2004/0168440 A1 Sep. 2, 2004

(30) Foreign Application Priority Data

Feb. 27, 2003 (JP) ............................. 2003-051578

(51) Int. Cl.
*F01N 3/00* (2006.01)

(52) U.S. Cl. .................... 60/289; 60/290; 60/291; 60/292; 60/293; 60/606; 60/608; 137/565.13; 417/280; 417/289

(58) Field of Classification Search ............. 60/289, 60/290, 291, 292, 293, 298, 606, 608; 137/565.73, 137/496; 417/280, 289

See application file for complete search history.

(56) References Cited

U.S. PATENT DOCUMENTS

| | | | | |
|---|---|---|---|---|
| 3,940,928 A | * | 3/1976 | Pozniak et al. | ................ 60/289 |
| 4,175,386 A | * | 11/1979 | Katahira et al. | .............. 60/276 |
| 4,346,555 A | * | 8/1982 | Stoltman | ...................... 60/290 |
| 4,450,680 A | * | 5/1984 | Otsuka et al. | ................ 60/274 |
| 5,271,223 A | * | 12/1993 | Hoshi | .......................... 60/276 |
| 5,567,393 A | * | 10/1996 | Muschelknautz et al. | ... 422/168 |

FOREIGN PATENT DOCUMENTS

| | | |
|---|---|---|
| JP | 7-158429 | 6/1995 |
| JP | 11-81998 | 3/1999 |
| JP | 2002-272080 | 9/2002 |

* cited by examiner

*Primary Examiner*—Binh Q. Tran
(74) *Attorney, Agent, or Firm*—Nixon & Vanderhye PC

(57) ABSTRACT

In the disclosed secondary air supply system, an on-off valve (13) is driven by the discharge pressure of an air pump (12). A diaphragm chamber (44) is arranged in the neighborhood of a discharge outlet (54), and a part of the discharge air flows directly into the diaphragm chamber (44). Thus, the on-off valve (13) is positively operated even at high places with low atmospheric pressure and has a fast open/close response. As an electromagnetic actuator is not used to drive the on-off valve (13), the voltage supplied to the air pump (12) (DC motor (29)) does not drop inconveniently, and at the same time, the cost is reduced. Further, the number of the lead wires (65) is reduced.

5 Claims, 2 Drawing Sheets

SECONDARY AIR SUPPLY SYSTEM

BACKGROUND OF THE INVENTION

1. Field of the Invention

The present invention relates to a secondary air supply system for supplying secondary air, to an exhaust pipe upstream of a catalyst, for purifying the exhaust gas.

2. Description of the Related Art

In a known secondary air supply system, a motor-driven air pump is rotationally driven and the secondary air under pressure is forcibly supplied to the exhaust pipe of an internal combustion engine (hereinafter referred to as "the engine") to promote the warming of the catalyst at the time of starting the engine.

In the secondary air supply system, an on-off valve is arranged in the secondary air path communicating between an air pump and the exhaust pipe to prevent the exhaust gas in the exhaust pipe from flowing in the reverse direction toward the air pump.

The following three types of driving means are known for operating the on-off valve:

(1) The valve element of the on-off valve is driven by the displacement of a diaphragm. The negative pressure is introduced, through a vacuum switching valve (VSV), into one of the diaphragm chambers defined by the diaphragm thereby to open the valve element (Japanese Unexamined Patent Publication No. 7-158429, for example).

(2) The valve element of the on-off valve is driven by the displacement of a diaphragm. The discharge pressure of an air pump is introduced into one of the diaphragm chambers defined by the diaphragm thereby to open the valve element (air switching valve (ASV)) (Japanese Unexamined Patent Publication No. 11-81998, for example).

(3) The valve element of the on-off valve (such as an E-combination valve) is driven by a motor-driven actuator (such as a linear solenoid). An "E-combination valve" means an electric-mechanical combination valve which combines a mechanical type valve with an electric type valve. The motor-driven actuator is driven by a control unit thereby to drive open the valve element (Japanese Unexamined Patent Publication No. 2002-272080, for example).

The three types of driving means, to operate the on-off valves described above, have the following disadvantages, respectively:

In the driving means described in (1) above for driving the valve element by the intake negative pressure of the engine, the negative pressure is reduced and the valve may not open sufficiently at high places with low atmospheric pressure. Also, the spring of the diaphragm chambers is required to be strengthened to prevent the valve from being opened by the exhaust gas pressure, thereby leading to a slow response from the start of the pump to the time when the valve closes.

In the driving means described of type (2), the disadvantage of type (1) is overcome. In view of the fact that the air pump and the ASV are arranged in spaced relation with each other, however, the path communicating between the air pump and the diaphragm chambers has a large volume. This results in a slow valve-open response from the start of the air pump to the time when the valve opens and a slow valve-close response from the stop of the air pump to the time when the valve is closed.

The driving means of type (3) obviate the disadvantages of types (1) and (2). In view of the fact that the E-combination valve is also operated at the time of starting the air pump, however, power is consumed by the operation of the E-combination valve and the control relay thereof in addition to the air pump. As a result, the voltage supplied to the air pump drops and the ability of the air pump to supply the secondary air pressure is reduced.

Also, in the driving means of type (3), the use of the E-combination valve increases the number of control relays required, which in turn increases the number of the lead wires (electrical wires) for controlling the E-combination valve, thereby leading to the disadvantage of an increased number of assembly steps and parts and a higher production cost.

SUMMARY OF THE INVENTION

This invention has been achieved in view of the situation described above, and an object thereof is to provide a secondary air supply system capable of solving all the problems described above.

Specifically, the object of this invention is to provide a secondary air supply system, in which the valve element is accurately operated even at high places with low atmospheric pressure, both the valve-open response and the valve-close response are high, and the elimination of the need of the E-combination valve obviates the inconvenience of the drop in the air pump supply voltage and prevents an increase in the number of the control relays and lead wires.

According to one aspect of the present invention, there is provided a secondary air supply system, wherein one of the diaphragm chambers is arranged in the neighborhood of the outlet of a blower, and part of the air discharged from the blower flows directly into one of the diaphragm chambers.

As a result, as soon as an air pump is activated, part of the air discharged from the outlet of the blower flows into one of the diaphragm chambers to thereby open the valve.

In this way, all the problems of the prior art are solved.

Specifically, with the secondary air supply system according to the present invention, the valve on-off operation can be performed accurately even at high places with low atmospheric pressure, both the valve-open response and the valve-close response are high, and the inconvenience of the drop in the air pump supply voltage is obviated due to a lack of an E-combination valve. Further, the number of the control relays and the lead wires is not increased.

According to another aspect of the present invention, there is provided a secondary air supply system, wherein a valve element is arranged in the neighborhood of a diaphragm, the internal path leading from the outlet of the blower to the on-off valve has a small volume, a pressure sensor is arranged for detecting the pressure of the internal path, and the operating conditions of the air pump are detected by the pressure sensor.

The small volume of the internal path facilitates the detection of the variations in the discharge pressure immediately after starting the air pump. In this way, the operating conditions of the air pump can be positively detected only by the output of the pressure sensor.

According to still another aspect of the present invention, there is provided a secondary air supply system comprising a transmission means constituting a single shaft connecting the diaphragm and the valve element, which shaft is preferably arranged on the same axis as the rotary shaft of the electric motor on the air outlet side of the air pump, and the on-off valve including the diaphragm unit is integrated with the air pump.

This configuration makes a compact pump unit having the air pump and the on-off valve (including the diaphragm unit) integrated with each other.

According to yet another aspect of the present invention, there is provided a secondary air supply system, wherein a valve element is adapted to close by being seated on the side of an opening of a valve seat member downstream of the pump.

Even in the case where the pressure of the exhaust gas is imparted to the side of the valve element downstream of the pump when the valve element is closed, the valve element is driven in the closing direction by the pressure of the exhaust gas and, therefore, is not inconveniently opened under the pressure of the exhaust gas.

As a result, even in the case where a check valve arranged downstream of the valve element fails, the exhaust gas is prevented from flowing reversely to the air pump.

According to a further aspect of the present invention, there is provided a secondary air supply system wherein a control relay for supplying the electric motor intermittently with the current from a DC power supply mounted on the vehicle is preferably arranged integrally with the electric motor in the neighborhood of the intake air path for leading the air from the air inlet of the air pump to the air inlet of the blower.

In this configuration, the control relay is cooled by the air flowing in the intake air path and prevented from increasing in temperature.

The present invention may be more fully understood from the description of preferred embodiments of the invention, as set forth below, together with the accompanying drawings.

DESCRIPTION OF THE PREFERRED EMBODIMENTS

Figure 1:
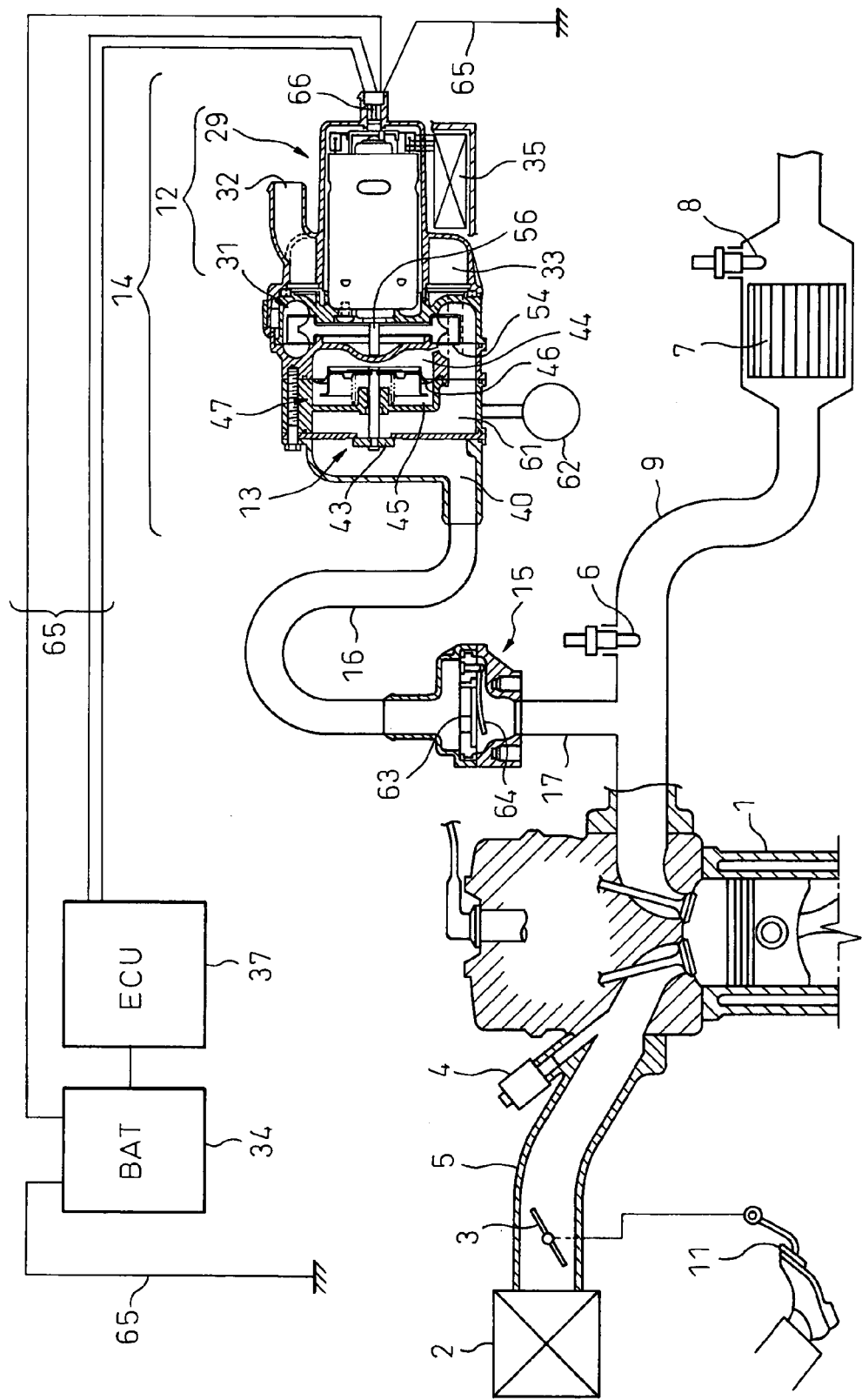
FIG. 1 is a schematic diagram showing a configuration of a secondary air supply system according to an embodiment of the present invention.

An embodiment of the invention is explained below with reference to FIGS. 1 and 2. First, a configuration of a secondary air supply system is explained with reference to FIG. 1.

An engine 1 is well-known and includes an intake pipe 5 having an air cleaner 2, a throttle valve 3 and an injector 4 arranged therewith, and an exhaust pipe 9 having an $O_2$ sensor 6, a catalyst 7 and a catalyst temperature sensor 8 arranged therein.

The opening degree of the throttle valve 3 is set at a value corresponding to the angle of an accelerator pedal 11 operated by the driver. The catalyst 7 is for purifying the exhaust gas by promoting the oxidation-reduction reaction of the exhaust gas.

The primary purpose of the secondary air supply system is to supply the secondary air forcibly into the exhaust pipe 9 upstream of the catalyst 7 to promote the warming of the catalyst 7 at the time of starting the engine 1 from cold state.

The secondary air supply system comprises a pump unit 14 having an air pump 12 and an on-off valve 13 (including a driving means) integrated with each other, a check valve 15 for preventing the reverse flow of the exhaust gas, a first pipe 16 for connecting the pump unit 14 to the check valve 15, and a second pipe 17 for connecting the check valve 15 to the exhaust pipe 9.

Next, the pump unit 14 is explained in detail. The pump unit 14, as shown in FIG. 2, has five cases (including, from the right side in FIG. 2, first to five cases 21 to 25) with internal component parts built therein, which cases are coupled integrally to each other by a screw 26, a clip 27 and an engaging piece 28.

The air pump 12 includes a direct current motor (DC motor) 29 and a centrifugal blower 31.

The first case 12 accommodating the DC motor 29 has, on the side (on the left side in FIG. 2) thereof nearer to the blower 31, an intake air path 33 formed in ring to lead the air from the air inlet 32 of the air pump 12 to the air inlet (not shown) of the blower 31.

Figure 2:
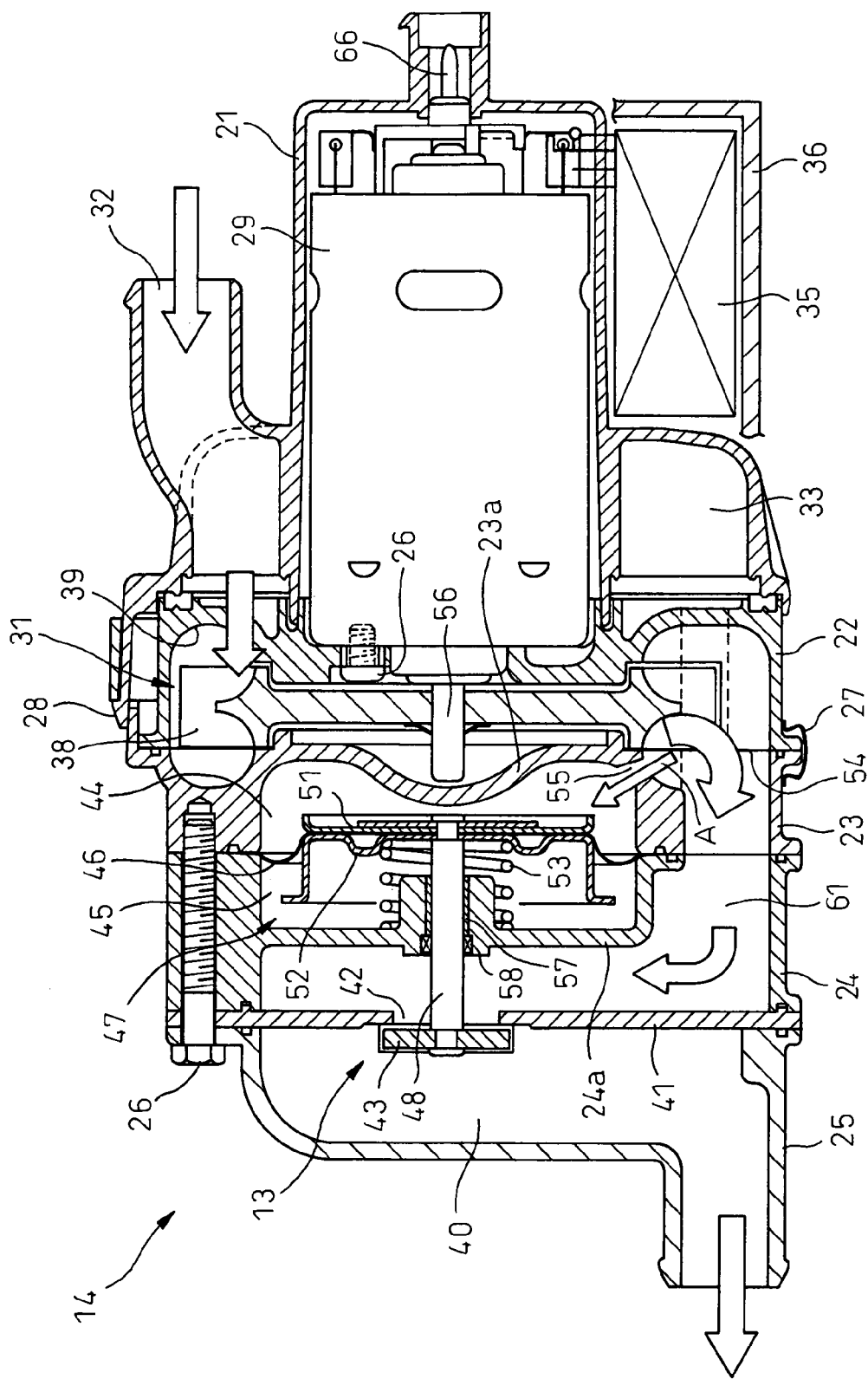
FIG. 2 is a sectional view of a pump unit of a secondary air supply system according to the present invention.

Under the first case 21 in FIG. 2, a mechanical relay (coil relay) 35 is arranged for supplying the DC motor 29 intermittently with the current from the battery (DC power supply) 34 mounted on the vehicle.

This mechanical relay 35 is a mechanical relay switch including a relay coil electrically controlled by an ECU (engine control unit) 37, and an on-off switch, for supplying the DC motor 29 intermittently with a current from the battery, operated by the magnetic force of the relay coil.

The mechanical relay 35 is accommodated in the cover 36 mounted on the first case 21 and integrated with the DC motor 29. The mechanical relay 35, which is arranged adjacent to the intake air path 33 and is integral with the DC motor 29, is cooled by the intake air flowing through the intake air path 33 and thus a temperature increase thereof is suppressed.

The blower 31 is configured of an impeller 38 driven by the DC motor 29 for supplying air under pressure and a blower case 39 covering the impeller 38. The blower case 39 includes a second case 22 fixed by a screw 26 at the left end of the DC motor 29 in FIG. 2, and a third case 23 fixed to the second case 22 by a clip 27.

Next, the on-off valve 13 is explained. The on-off valve 13 is for opening/closing the secondary air path 40 for leading the secondary air discharged from the blower 31 to the exhaust pipe 9, and includes a valve seat member 41 arranged in the secondary air path 40 in the pump unit 14 and a valve element 43 for opening/closing the opening 42 formed in the valve seat member 41.

The means for driving the valve element 43 includes a diaphragm unit 47 having a diaphragm 46 displaced by the pressure difference between a diaphragm chamber 44 into which the discharge pressure of the blower 31 is introduced and an atmospheric chamber 45 communicating with the atmosphere, and a shaft 48 (corresponding to a transmission means) for transmitting the displacement of the diaphragm 46 to the valve element 43.

The diaphragm unit 47, constituted of the space formed between the third case 23 and the fourth case 24, has the diaphragm chamber 44 on the air pump 12 side and the atmospheric chamber 45 communicating with the atmosphere, defined by the diaphragm 46 supported between the third case 23 and the fourth case 24. The substantially disc-shaped diaphragm 46 and the substantially disc-shaped impeller 38 are arranged in a proximately opposed relation to each other through a partitioning wall 23a of the third case 23.

The diaphragm 46 is made of an elastically deformable rubber material and has a substantial center thereof held between reinforcing plates 51, 52, which, in turn, have an end of the shaft 48 fixed at the center thereof.

A spring 53 for urging, in the valve-closing direction, the valve element 43 fixed at the other end of the shaft 48, is arranged in the atmospheric chamber 45.

The diaphragm chamber 44, as described above, is arranged in proximity to the impeller 38 of the blower 31 in a spaced relation with the partitioning wall 23a of the third case 23 in the neighborhood of the outlet of the blower 31. Part of the air discharged from the outlet 54 of the blower 31 directly flows into the diaphragm chamber 44. Specifically, a discharge pressure leading port 55 for leading part of the air discharged from the blower 31 into the diaphragm chamber 44 is formed in the neighborhood of the outlet 54 of the blower 31, so that upon activation of the air pump 12, part of the air discharged from the outlet 54 of the blower 31 flows directly into the diaphragm chamber 44 through the discharge leading port 55, as indicated by arrow A in FIG. 2, thereby to increase the internal pressure of the diaphragm chamber 44.

The shaft 48 is arranged on the same axis as the rotary shaft 56 of the DC motor 29, and is supported axially and slidably by a bushing (bush bearing) 57 supported on the partitioning wall 24a of the fourth case 24.

An oil seal 58 is mounted on the left side of the bushing 57 in FIG. 2, so that the oil component contained in the exhaust gas and liable to intrude into the secondary air path 40 is prevented from attaching to the bushing 57. Even in the case where the exhaust gas intrudes into the pump unit 14, therefore, the shaft 48 is prevented from being fixed by the oil component mixed with the exhaust gas.

The valve seat member 41 is supported between the fourth case 24 and the fifth case 25. An opening 42 is formed in the valve seat member 41 on the same axis as the rotary shaft 56 of the DC motor 29.

On the other hand, the valve element 43 is fixed at the other end of the shaft 48, as described above, and is adapted to close the opening 42 by being seated on the surface (periphery of the opening 42) of the valve seat member 41 downstream of the pump (left side in FIG. 2). Specifically, the surface of the valve element 43 of the on-off valve 13 adapted to come into closing contact with the valve seat member 41 is on the side nearer to the discharge outlet of the blower 31, while the other surface of the valve element 43 is on the exhaust side.

The valve element 43 is arranged in the neighborhood of the diaphragm 46 through the shaft 48, and the internal path 61 leading from the outlet 54 of the blower 31 to the valve element 43 has a small volume.

The internal path 61, as shown in FIG. 1, has mounted therein a pressure sensor 62 for detecting the pressure of the internal path 61, and the operating conditions of the air pump 12 are detected by the pressure sensor 62.

The small volume of the internal path 61 facilitates the detection by the pressure sensor 62 of the discharge pressure variation immediately after activation of the air pump 12. Thus, the operating conditions of the air pump 12 can be detected by the output of the pressure sensor 62.

The check valve 15 is for preventing the reverse flow of the exhaust gas in the exhaust pipe 9 toward the pump unit 14, and includes a metal lead valve 63 in the form of thin plate spring adapted to open under the pressure of the secondary air discharged from the pump unit 14. Depending on the pulsation frequency or the flow rate of the exhaust gas, however, the check valve 15 may become inoperative with the result that the exhaust gas may flow reversely toward the pump unit 14 through the check valve 15. In FIG. 1, reference numeral 64 designates a stopper for restricting the maximum opening degree of the metal lead valve 63.

The check valve 15 is heated by the exhaust gas. The pump unit 14, on the other hand, is configured of parts (such as a diaphragm 46) low in heat resistance. For this reason, the pump unit 14 is mounted in somewhat spaced relation with the exhaust pipe 9 and the check valve 15. As a result, the first pipe 16 for supplying the secondary air discharged from the pump unit 14 to the check valve 15 has a sufficient length to make difficult the transmission of the exhaust gas heat to the pump unit 14.

Next, the operation of the secondary air supply system is explained.

In response to an instruction given to the mechanical relay 35 from an ECU 37 to supply an electric current to the DC motor 29 at the time of starting the engine in cold state, the blower 31 is activated and the air is discharged from the outlet 54 of the blower 31. Then, part of the air discharged from the blower 31 flows into the diaphragm chamber 44. As a result, the pressure in the diaphragm chamber 44 rises as soon as the air pump 12 is started, so that the diaphragm 46 is displaced leftward in FIG. 2. This displacement is transmitted to the valve element 43 through the shaft 48 thereby to open the on-off valve 13. Then, the secondary air passed through the opening 42 is supplied forcibly into the exhaust pipe 9 through the first pipe 16, the check valve 15 and the second pipe 17 thereby to promote the warming of the catalyst 7.

When an instruction is issued by the ECU 37 to the mechanical relay 35 to stop supplying electric current to the DC motor with the temperature rise of the catalyst 7, the blower 31 stops and the pressure at the discharge outlet of the blower 31 drops and so does the pressure in the diaphragm chamber 44. Then, the diaphragm 46 is displaced rightward in FIG. 2 by the restitutive power of the spring 53, which displacement is transmitted to the valve element 43 through the shaft 48 thereby to close the on-off valve 13. At the same time, the check valve 15 is closed and prevents the exhaust gas in the exhaust pipe 9 from flowing reversely to the pump unit 14.

In the secondary air supply system according this embodiment, the diaphragm chamber 44 is arranged in the neighborhood of the outlet 54 of the blower 31, so that part of the air discharged from the blower 31 flows directly into the diaphragm chamber 44. With this configuration, at the same time that the air pump 12 is stated, part of the air discharged from the outlet 54 of the blower 31 flows into the diaphragm chamber 44 and opens the on-off valve 13.

As a result, the secondary air supply system according to this embodiment has the following advantages:

(a) Unlike in the prior art, the on-off valve is not driven using the negative pressure, and therefore the on-off valve 13 is operated accurately even at high places with low atmospheric pressure.

(b) Both the valve-open response from the start of the air pump 12 to the time when the on-off valve 13 opens, and the valve-close response from the stop of the air pump 12 to the time when the on-off valve 13 closes, are fast.

(c) As the E-combination valve is not used, the power which otherwise might be consumed by the operation of the E-combination valve and the control relays (IC relay, mechanical relay, etc.) for electrically controlling the E-combination valve is saved. As a result, a drop in the voltage supplied to the air pump 12 (DC motor 29) is avoided and an ability to supply secondary air under pressure is not adversely affected.

(d) The lack of the E-combination valve eliminates the need of the control relays for electrically controlling the E-combination valve. Therefore, the number of the control relays mounted on the pump unit 14 is reduced as compared with when the E-combination valve is used.

Also, the elimination of the control relays for the E-combination valve reduces the number of the lead wires (electrical wires) 65 used for the secondary air supply system. Specifically, the number of the lead wires 65 for the control relays of the E-combination valve is reduced.

A specific example in which the number of the lead wires is reduced is explained below.

When the E-combination valve is used, and the IC relay is used as a control relay for the E-combination valve, and the IC relay is mounted on other place than the pump unit 14, the lead wires would require eleven lead wires 65.

The 11 lead wires 65 would be used for the connection between the IC relay and the battery 34, the connection between the IC relay and the air pump 12, the connection between the IC relay and the E-combination valve, the connection between the IC relay and the ground (GND), the connection between the IC relay and the ECU 37 as a lead wire for controlling the air pump, the connection between IC relay and the ECU 37 as a lead wire 65 for controlling the E-combination valve, the connection between the E-combination valve and the ground, the connection between the battery 34 and the ground, the connection between the IC relay and the ECU 37, and the connection between the IC relay and the battery 34 as a lead wire for supplying power to the internal controller.

According to this embodiment, in contrast, the number of the lead wires 65 is reduced to five, in view of the fact that the mechanical relay 35 integrally mounted on the pump unit 14 is employed as a control relay of the air pump 12 without using the E-combination valve.

The remaining five lead wires are used for the connection between the mechanical relay 35 and the battery 34, the connection between the mechanical relay 35 and the air pump 12, the connection between the mechanical relay 35 and the ECU 37 as a lead wire 65 for controlling the air pump, the connection between the battery 34 and the ground, and the connection between the air pump 12 and the ground.

As described above, according to this embodiment, the number of the lead wires is reduced from 11 to five. As a result, not only the cost but also the resistance between the lead wires due to the reduction of the number of the lead wires are reduced, thereby reducing the voltage drop across the air pump 12 (DC motor 29). Also, a reduced number of the connecting pins of the connector 66 reduces the chance of contact failure.

(e) The valve element 43 is arranged in the neighborhood of the diaphragm 46 and the internal path 61 leading from the outlet 54 of the blower 31 to the on-off valve 13 has a small volume. Therefore, the pressure sensor 62 can easily detect the variation in discharge pressure immediately after the start of the air pump 12. As a result, the operating conditions of the air pump 12 can be positively detected simply from the pressure detected by the pressure sensor 62.

In the prior art (an example using an E-combination valve) for driving the on-off valve 13 with a motor-driven actuator, on the other hand, the operating conditions of the air pump 12 are detected in accordance with the pressure difference detected by the pressure sensor 62 by switching the E-combination valve while the air pump 12 is in operation. The prior art using the E-combination valve thus poses the problem that the increase of the number of control relays is required for checking the operating conditions of the air pump 12.

With the secondary air supply system according to this embodiment, in contrast, the increase of the number of control relays for switching the E-combination valve are not required, and therefore the number of control relays for checking the operating conditions of the air pump 12 are reduced.

(f) The shaft 48 for connecting the diaphragm 46 and the valve element 43 is arranged on the same axis as, and in proximity to, the rotary shaft 56 of the DC motor 29. Therefore, a compact pump unit 14 is realized with the air pump 12 and the on-off valve 13 (including the driving means) integrated with each other. Thus, the pump unit 14 can be mounted on the vehicle more easily.

(g) The valve element 43 is arranged seated on the side of the opening 42 downstream of the pump. Even in the case where the pressure of the exhaust gas is applied to the side of the valve element 43 downstream of the pump at the time of closing the valve 43, therefore, the valve element 43, driven in the closing direction by the pressure of the exhaust gas, is not opened by the pressure of the exhaust gas when being closed.

In case of a malfunction of the check valve 15, therefore, the exhaust gas is prevented from flowing in the reverse direction to the air pump 12.

Also, in view of the fact that the surface of the valve element 43 adapted to come into closing contact with the valve seat member 41 is located on the side nearer to the outlet of the blower 31, while the other surface of the valve element 43 is located on the exhaust side, the valve element 43 is pushed in the opening direction when the blower 31 is activated. In the case where the exhaust gas flows reversely from the exhaust side, therefore, the valve element 43 is pushed in the closing direction. Thus, the valve-open response is so high that the valve element 43 is prevented from being opened against the reverse flow of the exhaust gas.

(h) With the secondary air supply system according to this embodiment, the mechanical relay 35 is arranged integrally with the DC motor 29 in the neighborhood of the intake air path 33. Therefore, the mechanical relay 35 is cooled and prevented from increasing in temperature by the intake air flowing in the intake air path 33.

The embodiments described above represent a case in which the mechanical relay 35 is used for electrically controlling the DC motor 29. Nevertheless, an IC relay with a semiconductor switching device may alternatively be used. By replacing the mechanical relay 35 with the IC relay, a high-speed switching operation and pulse-width modulation (PWM) control operation of the DC motor 29 are made possible. The PWM control operation of the DC motor 29 permits the discharge flow rate of the air pump 12 to be changed in a manner meeting the system needs. In the case where the DC motor 29 is controlled by PWM control using the IC relay, the IC relay is heated. As described in the embodiments above, however, the IC relay, which is arranged integrally with the DC motor 29 in the neighborhood of the intake air path 33, is cooled by the intake air flowing in the intake air path 33, thereby making it possible to suppress the temperature increase of the IC relay.

In the embodiments described above, the shaft 48 is arranged coaxially with the rotary shaft of the DC motor 29. However, the shaft 48 is not necessarily arranged on the same axis as the rotary shaft 56 of the DC motor 29.

The embodiments described above use only one shaft 48 as an example of the transmission means. Nevertheless, the displacement of the diaphragm 46 may be transmitted to the valve element 43 by use of a plurality of parts including a gear, a cam and a link.

Unlike in the embodiments described above, an alternating current motor (AC motor) may be used instead of the DC motor 29 as an electric motor.

While the invention has been described by reference to specific embodiments chosen for purposes of illustration, it should be apparent that numerous modifications could be made thereto by those skilled in the art without departing from the basic concept and scope of the invention.

The invention claimed is:

1. A secondary air supply system comprising:
    an air pump including an electric motor and a blower;
    a secondary air path for leading the secondary air discharged from said blower to an exhaust pipe upstream of a catalyst for purifying the exhaust gas;
    an on-off valve operated to open/close said secondary air path; and
    a driving means for opening/closing the valve element of said on-off valve,
    wherein said driving means for opening/closing the valve element of said on-off valve includes a diaphragm unit having a diaphragm adapted to be displaced by the pressure difference between a diaphragm chamber with the discharge pressure of said blower led thereinto and an atmospheric chamber communicating with the atmosphere, and a transmission means for transmitting the displacement of said diaphragm to said valve element,
    wherein said diaphragm chamber is arranged in the neighborhood of the outlet of said blower, and part of the air discharged from said blower flows directly into said diaphragm chamber,
    wherein said valve element is arranged in the neighborhood of said diaphragm, and the internal path leading from said outlet of said blower to said on-off valve has a small volume, and
    wherein a pressure sensor for detecting the pressure of said internal path is arranged in said internal path, and the operating conditions of said air pump are detected by said pressure sensor.

2. A secondary air supply system according to claim 1,
    wherein said transmission means is a single shaft connecting said diaphragm and said valve element and arranged on the same axis as the rotary shaft of said electric motor on the air discharge side of said air pump, and
    wherein said on-off valve including said diaphragm unit and said air pump are integrated with each other.

3. A secondary air supply system according to claim 1,
    wherein said valve element is arranged in such a manner as to be seated in closing contact with the side of an opening of a valve seat member downstream of the pump.

4. A secondary air supply system according to claim 1, further comprising at least a control relay for supplying said electric motor intermittently with the current from a DC power supply mounted on a vehicle,
    wherein said control relay is arranged integrally with said electric motor in the neighborhood of the intake air path for leading the air from the air inlet of said air pump to the air inlet of said blower.

5. A secondary air supply system according to claim 1,
    wherein the surface of said valve element of said on-off valve adapted to be in closing contact with said opening is located nearer to the discharge outlet of said blower, and the other surface of said valve element is located on the exhaust side.

* * * * *